United States Patent
Wei et al.

(10) Patent No.: US 7,431,964 B2
(45) Date of Patent: Oct. 7, 2008

(54) METHOD OF FORMING A POROUS METAL CATALYST ON A SUBSTRATE FOR NANOTUBE GROWTH

(75) Inventors: Yi Wei, Chandler, AZ (US); Jeffrey H. Baker, Chandler, AZ (US); Bernard F. Coll, Fountain Hills, AZ (US); Steven M. Smith, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 845 days.

(21) Appl. No.: 11/016,406

(22) Filed: Dec. 17, 2004

(65) Prior Publication Data

US 2006/0134329 A1 Jun. 22, 2006

(51) Int. Cl.
*B05D 3/00* (2006.01)

(52) U.S. Cl. .......... 427/191; 427/249.1; 427/255.7; 427/77; 427/250; 117/92; 117/93

(58) Field of Classification Search .......... 427/250, 427/249.1, 255.7, 191, 77; 117/92, 93
See application file for complete search history.

(56) References Cited

U.S. PATENT DOCUMENTS

| 4,969,415 | A | 11/1990 | Bartha et al. |
| 5,319,279 | A | 6/1994 | Watanabe et al. |
| 6,596,187 | B2 | 7/2003 | Coll et al. |
| 6,764,874 | B1 * | 7/2004 | Zhang et al. ........ 438/99 |
| 6,777,770 | B2 | 8/2004 | Ahn et al. |
| 6,841,002 | B2 * | 1/2005 | Kang et al. ........ 117/92 |
| 7,304,423 | B2 * | 12/2007 | Sasaki et al. ...... 313/495 |
| 2002/0114949 | A1 | 8/2002 | Bower et al. |
| 2004/0134770 | A1 * | 7/2004 | Petersen ........ 204/192.38 |
| 2004/0250753 | A1 * | 12/2004 | Kang et al. ........ 117/92 |

OTHER PUBLICATIONS

International Search Report PCT/US05/40022 dated Sep. 10, 2007.

* cited by examiner

*Primary Examiner*—Bret Chen

(57) ABSTRACT

A method is provided for forming a porous metal catalyst (44) on a substrate (42) for nanotube (84) growth in an emissive display. The method comprises depositing a metal (44) onto a surface of a substrate (12) at an angle (Θ) to the surface, depositing a metal catalyst (72) onto the metal (44), and forming nanotubes (84) on the metal catalyst (72).

24 Claims, 3 Drawing Sheets

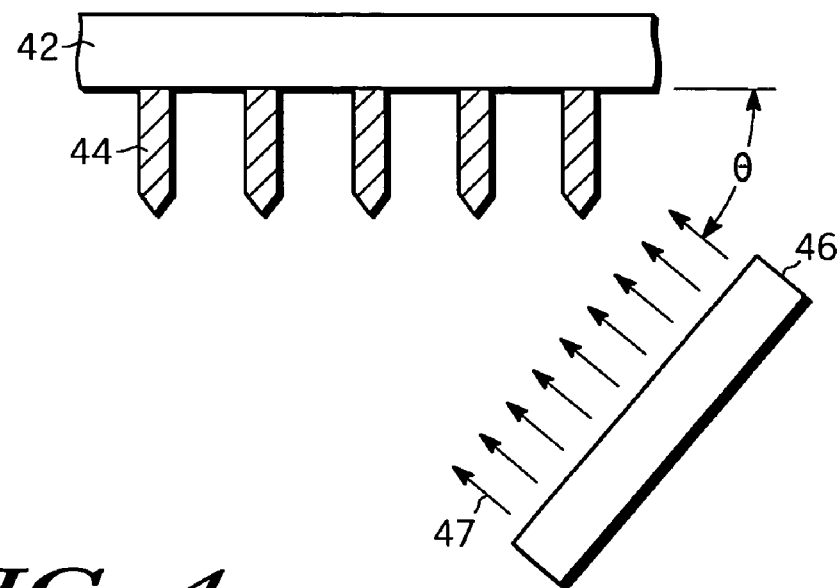
FIG. 4
FIG. 5
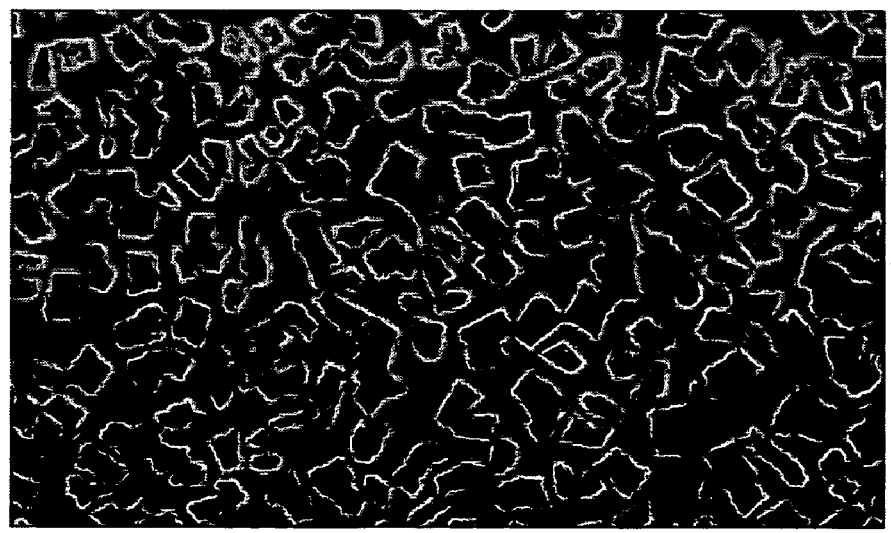

METHOD OF FORMING A POROUS METAL CATALYST ON A SUBSTRATE FOR NANOTUBE GROWTH

FIELD OF THE INVENTION

The present invention generally relates to nanotube field emission displays, and more particularly to a method for forming a porous metal catalyst on a substrate for nanotube growth.

BACKGROUND OF THE INVENTION

Carbon is one of the most important known elements and can be combined with oxygen, hydrogen, nitrogen and the like. Carbon has four known unique crystalline structures including diamond, graphite, fullerene and carbon nanotubes. In particular, carbon nanotubes refer to a helical tubular structure grown with a single wall or multi-wall, and commonly referred to as single-walled nanotubes (SWNTs), or multi-walled nanotubes (MWNTs), respectively. These types of structures are obtained by rolling a sheet formed of a plurality of hexagons. The sheet is formed by combining each carbon atom thereof with three neighboring carbon atoms to form a helical tube. Carbon nanotubes typically have a diameter in the order of a fraction of a nanometer to a few hundred nanometers.

Carbon nanotubes can function as either a conductor, like metal, or a semiconductor, according to the rolled shape and the diameter of the helical tubes. With metallic-like nanotubes, it has been found that a one-dimensional carbon-based structure can conduct a current at room temperature with essentially no resistance. Further, electrons can be considered as moving freely through the structure, so that metallic-like nanotubes can be used as ideal interconnects. When semiconductor nanotubes are connected to two metal electrodes, the structure can function as a field effect transistor wherein the nanotubes can be switched from a conducting to an insulating state by applying a voltage to a gate electrode. Therefore, carbon nanotubes are potential building blocks for nanoelectronic devices because of their unique structural, physical, and chemical properties.

Existing methods for the production of nanotubes, include arc-discharge and laser ablation techniques. Unfortunately, these methods typically yield bulk materials with tangled nanotubes. Recently, reported by J. Kong, A. M. Cassell, and H Dai, in Chem. Phys. Lett. 292, 567 (1988) and J. Hafner, M. Bronikowski, B. Azamian, P. Nikoleav, D. Colbert, K. Smith, and R. Smalley, in Chem. Phys Lett. 296, 195 (1998) was the formation of high quality individual single-walled carbon nanotubes (SWNTs) demonstrated via thermal chemical vapor deposition (CVD) approach, using Fe/Mo or Fe nanoparticles as a catalyst. The CVD process has allowed selective growth of individual SWNTs, and simplified the process for making SWNT based devices. However, the choice of catalyst materials that can be used to promote SWNT growth in a CVD process has been limited to only Fe/Mo nanoparticles. Furthermore, the catalytic nanoparticles were usually derived by wet chemical routes, which are time consuming and difficult to use for patterning small features.

Another approach for fabricating nanotubes is to deposit metal films using ion beam sputtering to form catalytic nanoparticles. In an article by L. Delzeit, B. Chen, A. Cassell, R. Stevens, C. Nguyen and M. Meyyappan in Chem. Phys. Lett. 348, 368 (2002), CVD growth of SWNTs at temperatures of 900° C. and above was described using Fe or an Fe/Mo bi-layer thin film supported with a thin aluminum under layer. However, the required high growth temperature prevents integration of CNTs growth with other device fabrication processes.

Ni has been used as one of the catalytic materials for formation of SWNTs during laser ablation and arc discharge process as described by A. Thess, R. Lee, P. Nikolaev, H. Dai, P. Petit, J. Robert, C. Xu, Y. H. Lee, S. G. Kim, A. G. Rinzler, D. T. Colbert, G. E. Scuseria, D. Tomanet, J. E. Fischer, and R. E. Smalley in Science, 273, 483 (1996) and by D. S. Bethune, C. H. Kiang, M. S. de Vries, G. Gorman, R. Savory, J. Vazquez, and R. Beyers in Nature, 363, 605 (1993). However, attempts to use a solution based Ni catalyst to grow individual SWNTs by CVD has not been successful. Additionally, although a thin Ni film has been widely used to produce MWNTs, growth of SWNTs using a Ni thin film as the active catalyst film layer has not been achieved.

A carbon nanotube is known to be useful for providing electron emission in a vacuum device, such as a field emission display. The use of a carbon nanotube as an electron emitter has reduced the cost of vacuum devices, including the cost of a field emission display. The reduction in cost of the field emission display has been obtained with the carbon nanotube replacing other electron emitters (e.g., a Spindt tip), which generally have higher fabrication costs as compared to a carbon nanotube based electron emitter.

The manufacturing costs for vacuum devices (e.g., a field emission display) that use a carbon nanotube can be further reduced if the carbon nanotube is grown on the field emission substrate from a catalytic surface using chemical vapor deposition or other film deposition techniques. Nanotube growth can be conducted as a last deposition process preventing the degradation of the electron emitter properties by other device processing techniques or steps (e.g., wet processes).

Accordingly, it is desirable to provide a porous metal catalyst on a substrate for carbon nanotube growth. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided for forming a porous metal catalyst on a substrate for nanotube growth in an emissive display. The method comprises depositing a metal onto a surface of a substrate at an angle to the surface, depositing a metal catalyst onto the metal, and forming nanotubes on the metal catalyst.

BRIEF DESCRIPTION OF THE DRAWINGS

The present invention will hereinafter be described in conjunction with the following drawing figures, wherein like numerals denote like elements.

FIG. 4 is a cross sectional view of the preferred embodiment of the present invention;

FIG. 5 is a picture of a top view of the preferred embodiment of FIG. 4;

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
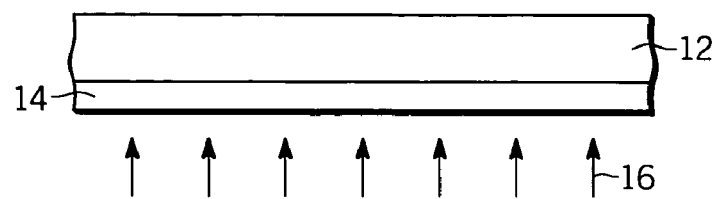
FIG. 1 is a cross sectional view of a previously known catalyst structure.
Figure 2:
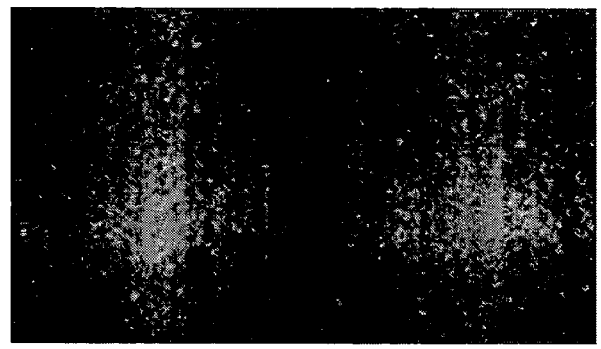
FIG. 2 is a picture of a top view of the catalyst structure of FIG. 1.
Figure 3:
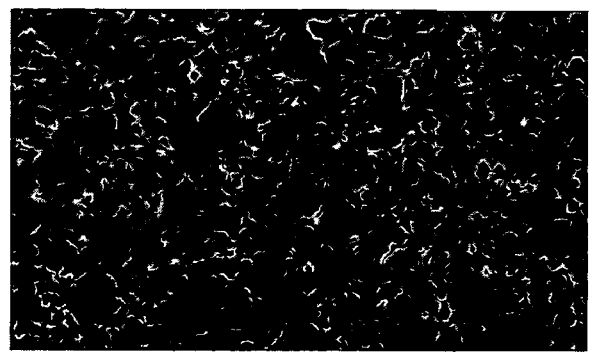
FIG. 3 is a picture of a top view after etching of the catalyst structure of FIG. 2.

Referring to FIG. 1, a previously known process comprises depositing a metal catalyst film 14 on the substrate 12 from a source (not shown) directly, or perpendicular, as represented by the arrows 16 onto the substrate 12. The resulting metal catalyst film 14 is relatively smooth as seen in FIG. 2. The metal catalyst film 14 is then etched to provide a rougher surface as seen in FIG. 3. Although nanotubes can be grown on the etched catalyst, the process may be cumbersome.

Figure 6:
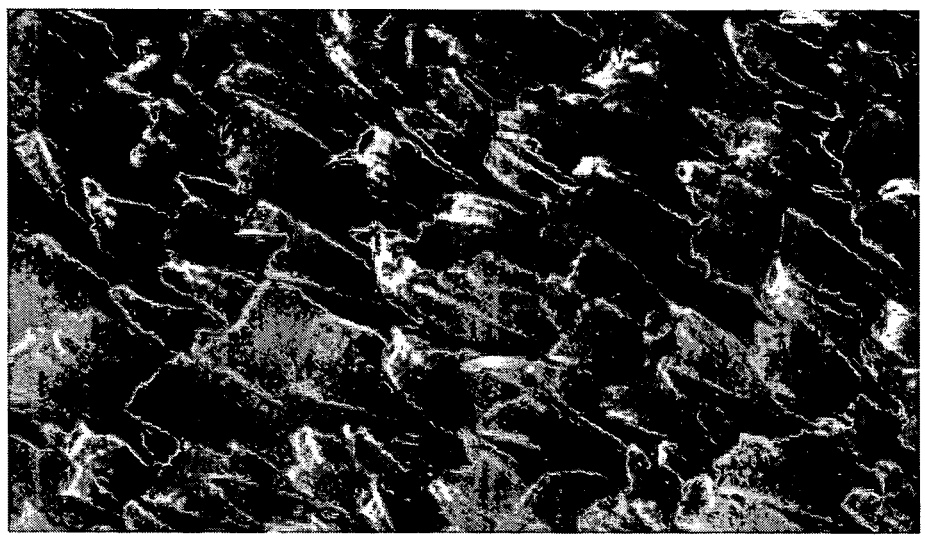
FIG. 6 is a picture of a perspective top view of the preferred embodiment of FIG. 4.

Referring to FIG. 4, in accordance with the present invention, a porous metal 44 is deposited onto the substrate 42 with the source 46 placed so that the metal being deposited (represented by arrows 47) is applied to the substrate 42 at an angle Θ for a certain time depending on desired film thickness. This angular deposition results in the porous metal 44 forming as columns 48, preferably approximately 500 to 25,000 angstroms thick. FIGS. 5 and 6 show these columns 48 from a top view and a top perspective view, respectively. The substrate 42 comprises silicon; however, alternate materials, for example, silicon, glass, ceramic, metal, a semiconductor material, or a flexible material are anticipated by this disclosure. Substrate 12 can include control electronics or other circuitry, which are not shown in this embodiment for simplicity. Also, substrate 12 may include an insulating layer, such as silicon dioxide, silicon nitride, or the like. The porous metal 44 is molybdenum, but may comprise any metal with a high melting temperature, for example, Nobium, Hafnium, Tungsten or iridium, and is deposited at room temperature up to 500° C. The higher temperatures results in more closely packed columns 48. The angle of the deposition is preferably in the range of 10° to 30° from the plane of the substrate 12 surface. A larger angle results in more closely packed columns 48.

Figure 7:
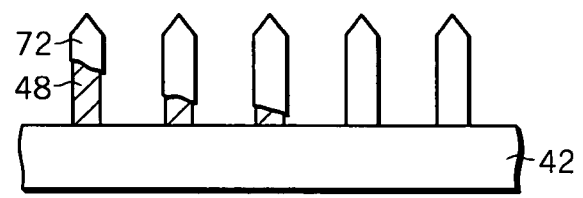
FIG. 7 is a cross sectional view of the preferred embodiment of FIG. 4.

Referring to FIG. 7, a metal catalyst 72 is deposited onto the metal columns 48, preferably at room temperature, resulting in a thin layer of approximately 10 angstroms to 40 angstroms. The metal catalyst preferably comprises Nichel (Ni), but alternatively can be formed of alloys made of transition metal, for example, Fe/Co, Ni/Co or Fe/Ni. Or a low melting temperature metal like Aluminum can be deposited on the porous supporting metal before the catalyst metal deposition to capture the bi-layer catalyst structure.

Figure 8:
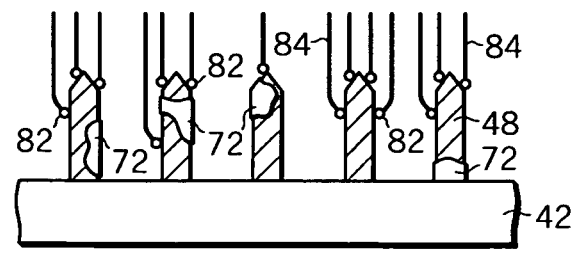
FIG. 8 is a cross sectional view of the preferred embodiment of FIG. 7.

Referring to FIG. 8, a carbon vapor deposition growth using hydrogen ($H_2$) and a carbon containing gas, for example methane ($CH_4$), is accomplished at between 450° C. and 850° C., but preferably at 500° C. This growth results in the metal catalyst 72 forming as particles 82 on the metal columns 48, though some of the metal catalyst 72 will remain as a thin layer on the columns 48. Simultaneously, as the particles 82 are being formed, carbon nanotubes 84 grow on these particles 82 generally aligned with the columns 48.

Thus, a new and improved method of fabricating a nanotube structure has been disclosed. This method provides a columnar and porous metal as a supporting structure for a catalyst for subsequent nanotube growth. This method provides a porous metal film with a large surface area for catalyst for nanotube growth and there is no wet or dry chemical etching involved in the process. The deposition of the porous metal supporting film and catalyst can be done in one single run in the deposition system. Additionally, the large surface area leads to the formation of smaller catalyst particles during nanotube CVD growth and thus, to high quality nanotubes.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method comprising:
    providing a substrate having a surface;
    depositing a metal onto the substrate at an angle to the surface resulting in a porous metal layer;
    depositing a metal catalyst as a plurality of particles onto the porous metal layer; and
    forming nanotubes on the metal catalyst particles.

2. The method of claim 1 wherein the depositing a metal comprises depositing a high melting temperature metal that melts at a temperature above 1,000° C.

3. The method of claim 1 wherein the depositing a metal comprises depositing molybdenum.

4. The method of claim 1 wherein the depositing a metal comprises depositing the metal at a temperature within the range of room temperature to 500° C.

5. The method of claim 1 wherein the depositing a metal catalyst comprises depositing the metal catalyst at approximately room temperature.

6. The method of claim 1 wherein the depositing a metal catalyst comprises depositing the metal catalyst to form a catalyst layer that has a thickness in the range of 10 to 40 Angstroms.

7. The method of claim 1 wherein the forming nanotubes comprises forming nanotubes within a temperature range of 150° to 850° C.

8. The method of claim 1 wherein the forming nanotubes comprises forming nanotubes by using hydrogen and methane.

9. A method comprising:
    providing a substrate having a surface;
    depositing a metal onto the substrate at an angle of between 10 to 30 degrees to the surface resulting in a porous metal;
    depositing a metal catalyst onto the porous metal; and
    performing a growth using hydrogen and carbon containing gases to convert at least some of the metal catalyst into particles while simultaneously growing carbon nanotubes on the particles.

10. The method of claim 9 wherein the depositing a metal comprises depositing a high melting temperature metal that melts at a temperature above 1,000° C.

11. The method of claim 9 wherein the depositing a metal comprises depositing molybdenum.

12. The method of claim 9 wherein the depositing a metal comprises depositing the metal at a temperature within the range of room temperature to 500° C.

13. The method of claim 9 wherein the depositing a metal catalyst comprises depositing the metal catalyst at approximately room temperature.

14. The method of claim 9 wherein the depositing a metal catalyst comprises depositing the metal catalyst to form a catalyst layer that has a thickness in the range of 10 to 40 Angstroms.

15. The method of claim 9 wherein the growing nanotubes comprises forming nanotubes within a temperature range of 150° to 850 ° C.

16. The method of claim 9 wherein the growing nanotubes comprises forming nanotubes by using hydrogen and methane.

17. A method for forming an emissive display, comprising:
providing a substrate having a surface;
depositing a metal onto the surface from a source so the metal strikes the surface at an angle to form a plurality of columns;
depositing a catalyst onto the plurality of columns; and
depositing carbon containing gases and hydrogen onto the catalyst so particles are formed from the catalyst and carbon nanotubes are grown from the particles.

18. The method of claim 17 wherein the depositing a metal comprises depositing a high melting temperature metal that melts at a temperature above 1,000° C.

19. The method of claim 17 wherein the depositing a metal comprises depositing molybdenum.

20. The method of claim 17 wherein the depositing a metal comprises depositing the metal at a temperature within the range of room temperature to 500° C.

21. The method of claim 17 wherein the depositing a catalyst comprises depositing the metal catalyst at approximately room temperature.

22. The method of claim 17 wherein the depositing a catalyst comprises depositing the metal catalyst to form a catalyst layer that has a thickness in the range of 10 to 40 Angstroms.

23. The method of claim 17 wherein the growing nanotubes comprises forming nanotubes within a temperature range of 150° to 850° C.

24. The method of claim 17 wherein the growing nanotubes comprises forming nanotubes by using hydrogen and methane.

* * * * *